(12) United States Patent
Dowty et al.

(10) Patent No.: US 12,377,983 B2
(45) Date of Patent: Aug. 5, 2025

(54) ARRANGEMENTS OF LIE FLAT SEATS WITH OBLIQUE FRONT ROW

(71) Applicant: B/E Aerospace, Inc., Winston-Salem, NC (US)

(72) Inventors: Mark B. Dowty, Rural Hall, NC (US); Oscar Ruiz Lara, Kirkland, WA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 18/119,005

(22) Filed: Mar. 8, 2023

(65) Prior Publication Data
US 2024/0300651 A1    Sep. 12, 2024

(51) Int. Cl.
*B64D 11/06* (2006.01)

(52) U.S. Cl.
CPC ...... *B64D 11/0641* (2014.12); *B64D 11/0601* (2014.12); *B64D 11/0646* (2014.12)

(58) Field of Classification Search
CPC ............ B64D 11/0641; B64D 11/0601; B64D 11/0646
See application file for complete search history.

(56) References Cited

U.S. PATENT DOCUMENTS

| 2,947,349 | A | 8/1960 | Kryter |
| 9,315,270 | B2 | 4/2016 | Dryburgh et al. |
| 2013/0106156 | A1 | 5/2013 | Orson et al. |
| 2015/0166182 | A1 | 6/2015 | Ducreux et al. |
| 2015/0336674 | A1 | 11/2015 | Foucher et al. |
| 2017/0008632 | A1* | 1/2017 | Eberle ................ B64D 11/0601 |
| 2017/0327232 | A1 | 11/2017 | Morgan |
| 2019/0315468 | A1* | 10/2019 | White ................ B64D 11/0605 |
| 2021/0001986 | A1* | 1/2021 | Harcup ............. B64D 11/0606 |
| 2023/0182903 | A1* | 6/2023 | Manson ............ B64D 11/0601 |
| | | | 244/118.6 |

FOREIGN PATENT DOCUMENTS

| DE | 102020105072 A1 | 8/2021 |
| EP | 0850834 A1 | 7/1998 |
| EP | 3378770 A1 | 9/2018 |

OTHER PUBLICATIONS

European Patent Office, Extended European Search Report received in EP Application No. 24162333.9, Aug. 23, 2024, 9 pages.

* cited by examiner

*Primary Examiner* — Ashesh Dangol
(74) *Attorney, Agent, or Firm* — Suiter Swantz IP

(57) ABSTRACT

The present disclosure provides layouts of columns of lie flat passenger seats for an aircraft cabin. Each column includes a first row, such as a front row, including at least one oblique seat, a second row including at least one forward facing seat, and at least one further row including at least one forward facing seat. None of the seat rows, other than the first rows, include an oblique seat. Each seat is configured to adjust between an upright condition and a lie flat condition, nest with at least one other seat, and utilize a forward footwell formed in a console associated with another seat or a monument. The oblique first row provides a space savings in the cabin layout as compared to conventional layouts wherein all seats are oriented forward facing.

13 Claims, 6 Drawing Sheets

ARRANGEMENTS OF LIE FLAT SEATS WITH OBLIQUE FRONT ROW

TECHNICAL FIELD AND BACKGROUND

The present disclosure relates generally to passenger seat layouts for aircraft cabins, and more particularly, to nesting arrangements of lie flat seats including a row of oblique seats and a row of forward facing seats for space savings in the passenger cabin.

Layouts of passenger seats in commercial airliners typically include rows and columns. Columns are typically oriented parallel to the aircraft longitudinal axis while rows are typically oriented transverse to the aircraft longitudinal axis. Columns are typically separated by longitudinal aisles. Narrow body aircraft may include a single longitudinal aisle separating two columns, whereas wide body aircraft may include two longitudinal aisles separating three columns. In wide body aircraft, seat rows in the center column may include a greater number of seats as compared to rows in the outboard columns considering the desire to provide direct seat access from one of the longitudinal aisles.

Passenger seats within each row and column may be oriented at different angles. Per the Federal Aviation Administration (FAA), passenger seats may be classified as forward facing or side-facing depending on the seat installation angle. Different certification criteria are provided depending on the installation angle from the aircraft centerline as measured from the forward direction. Forward facing seats include any seat installed at an angle up to and including 18 degrees. Side facing seats include any seat installed at an angle greater than 18 degrees. Oblique seats, which are a subset of side facing seats, include any seat installed at an angle greater than 18 degrees up to and including 45 degrees.

Conventional layouts of passenger seats, and in particular business class passenger seats, include forward facing, herringbone, and reverse herringbone layouts. In each of these layouts, each row is configured the same as at least one other row such that rows or row pairings can be repeated along the longitudinal length of the cabin. While repetition provides for uniformity and cost savings, some cabin layouts would benefit from at least one unique seat row, for example, where the fuselage shape or other portions of the cabin do not allow for a uniform row.

Therefore, it would be desirable to provide a unique layout of seats that balances seat density and lie flat all-access configurations.

BRIEF SUMMARY

To achieve the foregoing and other advantages, according to a first aspect, the present disclosure provides a layout for a column of lie flat passenger seats for an aircraft passenger cabin. The layout includes a first row, for instance a front row, including at least one oblique seat, a second row including at least one forward facing seat, and at least one further row including at least one forward facing seat. None of the second row and the at least one further row includes an oblique seat. Each of the at least one oblique seat and the at least one forward facing seat of each of the second row and the at least one further row is configured to adjust between an upright condition and a lie flat condition. When in the lie flat condition, each of the at least one oblique seat and the at least one forward facing seat of each of the second row and the at least one further row is configured to nest with at least one other seat.

In some embodiments, the first row is a front row, the column is a center column configured to be positioned between two longitudinal aisles oriented parallel to an aircraft longitudinal axis, the first row includes two oblique seats, and the two oblique seats are oriented in a toes-out or a toes-in configuration.

In some embodiments, the second row includes two forward facing seats, each of the at least one further row includes two forward facing seats, and the two forward facing seats of the second row and the at least one further row are positioned in an alternating configuration in which every other row the two forward facing seats are positioned side-by-side and every other row the two forward facing seats are positioned spaced apart.

In some embodiments, the layout further includes a partition wall positioned aft of each of the front row, the second row, and the at least one further row.

In some embodiments, a portion of each of the two oblique seats, when in the lie flat condition, extends into a footwell space formed in a monument positioned forward of the front row.

In some embodiments, the layout further includes a partition positioned between the two oblique seats, the partition configured to adjust between an extended condition and a retracted condition.

In some embodiments, the first row, for instance the front row, includes a single oblique seat oriented toes-in or toes-out, the second row includes a single forward facing seat, each of the at least one further row includes a single forward facing seat, and the single forward facing seats of the second row and the at least one further row are positioned in an alternating inboard and outboard configuration relative to a longitudinal aisle.

In some embodiments, the layout further includes a console positioned to one side of each of the at least one oblique seat of the front row, the at least one forward facing seat of the second row, and the at least one forward facing seat of the at least one further row.

In some embodiments, the layout further includes a footwell space formed in each console.

In a further aspect, the present disclosure provides a layout for a passenger cabin of an aircraft. The layout includes a first longitudinal aisle oriented parallel to an aircraft longitudinal axis, a second longitudinal aisle oriented parallel to the aircraft longitudinal axis, a starboard column of lie flat seats positioned to one side of the first longitudinal aisle, a port column of lie flat seats positioned to one side of the second longitudinal aisle, and a center column of lie flat seats positioned between the first longitudinal aisle and the second longitudinal aisle. A first row, for instance a front row, of each of the starboard column and the port column includes a single oblique seat. A second row and at least one further row of each of the starboard column and the port column includes a single forward facing seat. A front row of the center column includes two oblique seats oriented in a toes-out or a toes-in configuration. A second row and at least one further row of the center column includes two forward facing seats. None of the second row and the at least one further row of each of the starboard column, the port column, and the center column includes an oblique seat.

In some embodiments, in the center column, the two forward facing seats of the second row and the at least one further row are positioned in an alternating configuration in which every other row the two forward facing seats are positioned side-by-side and every other row the two forward facing seats are positioned spaced apart.

In some embodiments, the layout further includes, in each of the starboard column, the port column, and the center column, a partition wall positioned aft of each of the front row, the second row, and the at least one further row.

In some embodiments, the layout further includes a monument positioned forward of the front row of each of the starboard column, the port column, and the center column, each monument including a footwell.

In some embodiments, the layout further includes a partition positioned between the two oblique seats in the center column, the partition configured to adjust between an extended condition and a retracted condition.

In some embodiments, for each of the starboard column and the port column, the single oblique seat is oriented toes-in or toes-out, and the single forward facing seats of the second row and the at least one further row are positioned in an alternating inboard and outboard configuration relative to their respective first or second longitudinal aisle.

In some embodiments, the layout further includes a console positioned to one side of each of the single oblique seat of the front row of each of the starboard column and the port column, the two oblique seats of the front row of the center column, the single forwarding facing seats of the second row and at least one further row of the starboard column and the port column, and the two forward facing seats of the second row and the at least one further row of the center column.

In some embodiments, a footwell space is formed in each console for use by a seat positioned aft of the console.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
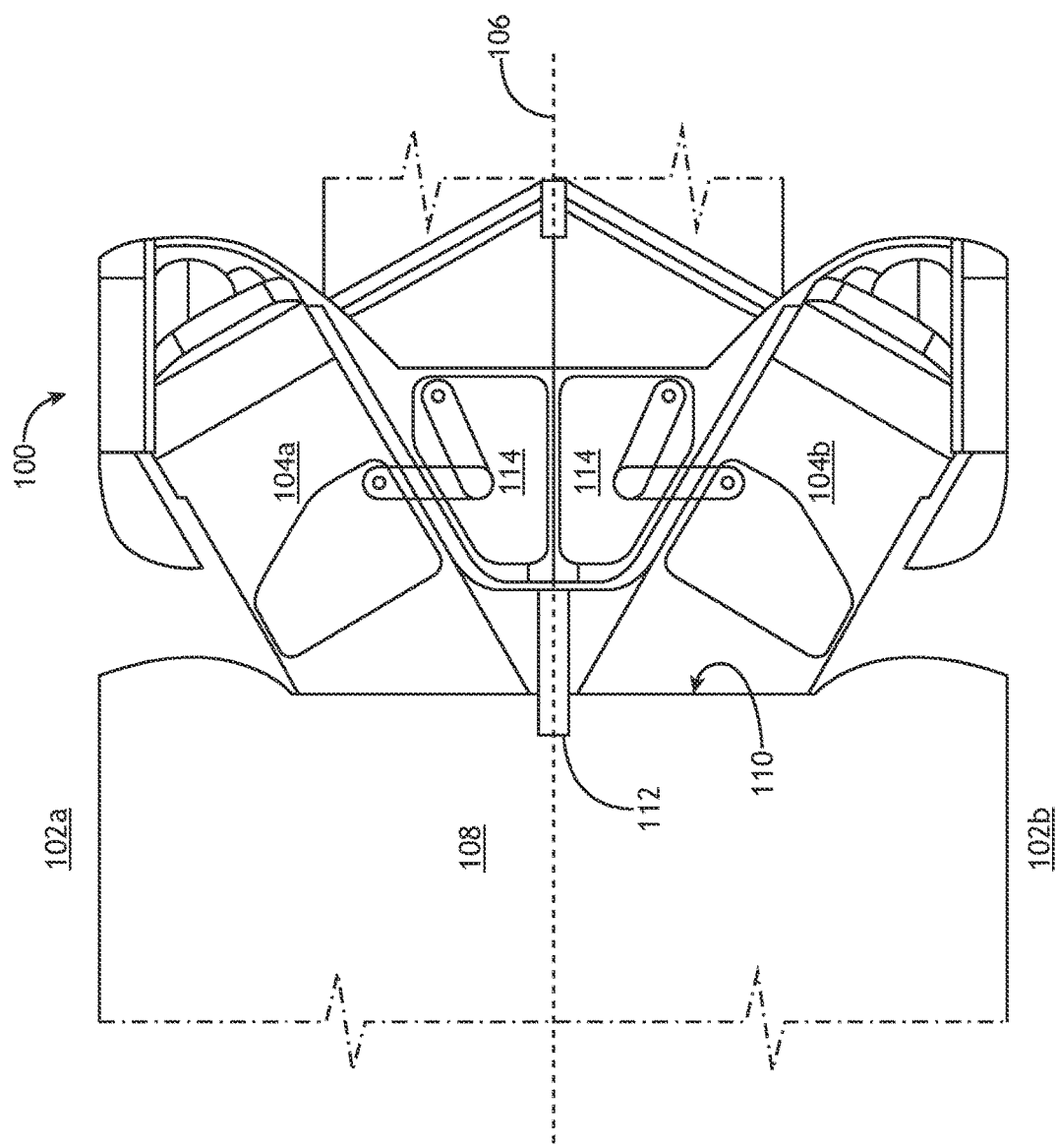
FIG. 1 is a plan view of a layout for an oblique first row for an aircraft passenger cabin, in accordance with at least one embodiment of the present disclosure.

Before explaining embodiments of the inventive concepts disclosed herein in detail, it is to be understood that the inventive concepts disclosed herein are not limited in their application to the details of construction and the arrangement of the components or steps or methodologies set forth in the following description or illustrated in the drawings. In the following detailed description of embodiments of the present disclosure, numerous specific details are set forth in order to provide a more thorough understanding of the inventive concepts. However, it will be apparent to one of ordinary skill in the art having the benefit of the present disclosure that the inventive concepts disclosed herein may be practiced without these specific details. In other instances, well-known features may not be described in detail to avoid unnecessarily complicating the present disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein, where applicable, a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). In addition, use of the "a" or "an" are employed to describe elements and components of embodiments of the present inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the present disclosure.

Broadly, the present disclosure provides layouts of lie flat passenger seats, for instance business class passenger seats, wherein the front row in any column of seats includes at least one oblique seat and the other seats in the second and further rows of the column include forward facing seats. In some embodiments, none of the second row and further rows of the same column include an oblique seat. Columns according to the present disclosure therefore include a front row seat configuration that is unique as compared to the other seat rows in that same column. In some embodiments, the front row is unique as compared to the second and further rows, and the further rows are unique as compared to the second row.

As used herein, the term "oblique seat" means any side facing seat installed at an angle greater than 18 degrees up to and including 45 degrees from the aircraft centerline. In a preferred embodiment, an oblique seat according to the present disclosure is installed at an angle of about 30 degrees. As used herein, the term "forward facing seat" means any seat installed at an angle up to and including 18 degrees from the aircraft centerline, regardless of whether the seat faces toward the front of the aircraft (i.e., forward facing) or toward the rear of the aircraft (i.e., aft facing). As used herein, the term "toes-in" means angled away from the nearest longitudinal aisle while the term "toes-out" means angled toward the nearest longitudinal aisle. For a starboard or port column, an oblique seat oriented "toes-out" means angled toward the fuselage wall whereas an oblique seat oriented "toes-in" means angled toward the nearest longitudinal aisle. For a center column, a pair of oblique seats oriented "toes-out" means seats converging in the direction of their head end whereas a pair of oblique seats oriented "toes-in" means seats converging in the direction of their foot end. The front of the aircraft and the direction of flight of the aircraft is toward the left of the page as viewed in the drawings. As used herein, the terms "nest" or "nesting" means to overlap in at least one of the lateral or longitudinal directions.

Referring to FIG. 1, a layout for a first row according to an embodiment of the present disclosure is shown generally at 100. The first row 100 may be a front row of a center column positioned between a first longitudinal aisle 102a and a second longitudinal aisle 102b. The first row 100 includes a first oblique seat 104a and a second oblique seat 104b both oriented toes-in such that the seats are angled away from their respective longitudinal aisle 102a, 102b to maximize privacy. The first and second obliques seats 104a, 104b are longitudinally aligned. In some embodiments, the seat pairing is symmetrical about the aircraft centerline 106. The first oblique seat 104a is directly accessible from the first longitudinal aisle 102a and the second oblique seat 104b is directly accessible from the second longitudinal aisle 102b. Thus, both seats have direct aisle access.

The first and second oblique seats 104a, 104b are shown in a lie flat condition forming a horizontal or substantially horizontal bed. Each of the first and second oblique seats 104a, 104b are adjustable between an upright condition for taxi, takeoff, and landing (TTOL) and a lie flat condition during flight. Intermediate sitting positions may include reclined backrest positions, extended leg rest positions, etc. The first and second oblique seats 104a, 104b may or may not include leg rest. In some embodiments, the first and second oblique seats 104a, 104b include adjustable leg rests that extend into forward footwell space discussed further below. In some embodiments, the first and second oblique seats 104a, 104b translate to meet a footrest positioned in a forward footwell. Seats according to the present disclosure may further include head rests, arm rests, climatization systems, massage systems, etc. Seat motions may be controlled via actuation systems known to those skilled in the art.

The first row 100 may be positioned directly aft of a monument 108, such as a partition, closet, galley component, lavatory, etc. The monument 108 may include interior space for storage, appliances, galley carts, passenger quarters, crew quarters, etc. Footwell space 110 formed in the monument 108 accommodates bed deployment. The first row 100 may further include a partition 112 positioned between the first and second oblique seats 104a, 104b. In some embodiments, the partition 112 is configured to extend or deploy to close the space between the first and second oblique seats 104a, 104b and retract or stow to open the space between the first and second oblique seats 104a, 104b. In some embodiments, the partition 112 may extend by raising vertically and retract by lowering vertically, extend by translating horizontally in one direction and retract by translating horizontally in the opposite direction, for instance moving in and out of the monument 108.

The first row 100 further includes a console 114 positioned to one side of each of the first and second oblique seats 104a, 104b. Each console 114 generally includes a horizontal surface that may serve as a working surface and mounting location for seat controls, wireless charger, etc. The first row 100 may further include, for each of the first and second oblique seats 104a, 104b, a deployable meal table such as that shown deploying to an over-seat position via a linkage mechanism, a video monitor, and other amenities commensurate with passenger expectations of a business class seat. As discussed further below, each console 114 forms a footwell for use by a passenger in an aft row. Optional first row 100 features include partition walls, further privacy dividers, climatization systems, lighting systems, entry doors, etc.

Figure 2:
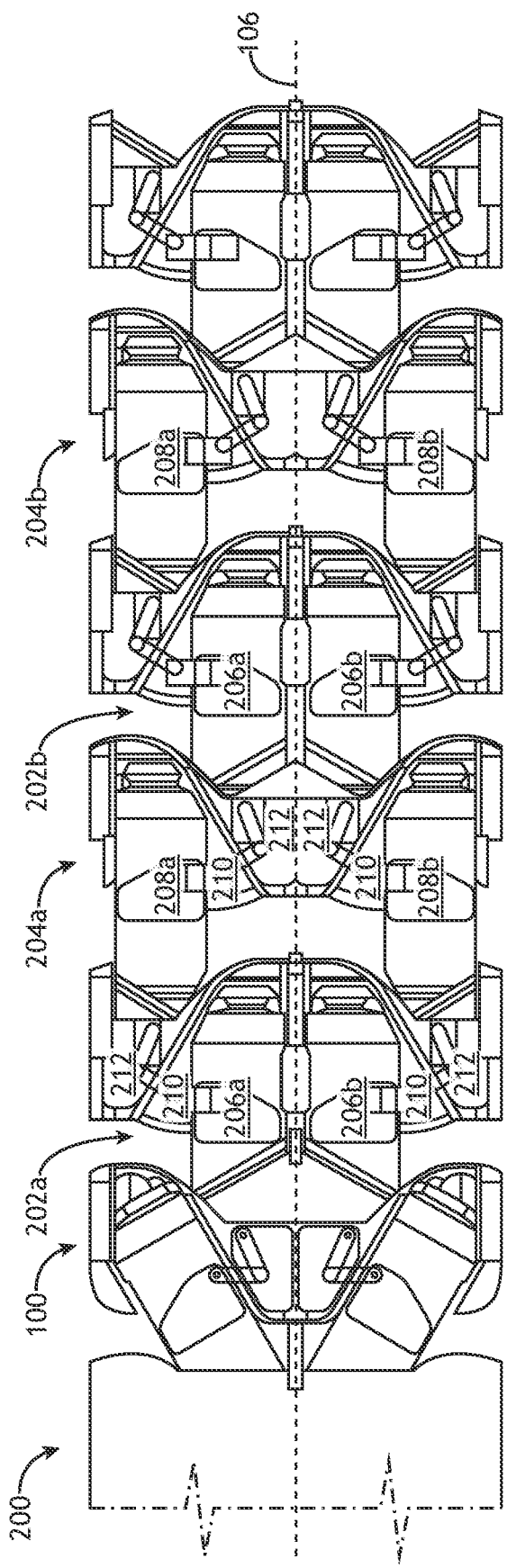
FIG. 2 is a plan view of a layout for a center column including an oblique first row, in accordance with at least one embodiment of the present disclosure.

Referring to FIG. 2, a layout for a center column according to an embodiment of the present disclosure is shown generally at 200. The center column 200 includes the first row 100 shown in FIG. 1. The center column 200 further includes a second row 202a, a third row 204a, and a plurality of further rows in alternating fashion of the configuration of the second and third rows 202a, 204a. Thus, the first row 100 is unique as compared to all other rows, the even number rows 202a, 202b . . . 202n all have the same configuration unique to these rows, and the odd number rows 204a, 204b . . . 204n all have the same configuration unique to these rows (excluding the front row). As shown, the center column 200 is symmetrical about the aircraft centerline 106.

From the second row 202a to the end of the center column 200, none of these rows include an oblique seat. In other words, only the first row 100, which may a front row, includes oblique seats. As shown, each of the second row 202a through the last row shown include only forward facing seats, and more specifically, passenger seats oriented parallel to the aircraft longitudinal axis (i.e., the aircraft centerline 106). Each of the second row 202a and fourth row 202b include a seat pairing including first and second forward facing seats 206a, 206b positioned side-by-side and longitudinally aligned. Each of the third row 204a and fifth row 204b include a seat pairing including first and second forward facing seats 208a, 208b positioned spaced apart and longitudinally aligned. Each seat in the second row 202a back includes a console 210 positioned alongside the seat, which may or may not include a footwell for use by an aft positioned seat. Each seat in the second row 202a back may further include a further console 212 positioned forward of the seat, which may include a footwell for use by the respective seat. Each seat in the second row 202a back is configured to adjust between the upright condition and the lie flat condition. When in the lie flat condition, each seat is configured to nest with at least one other seat.

Figure 3:
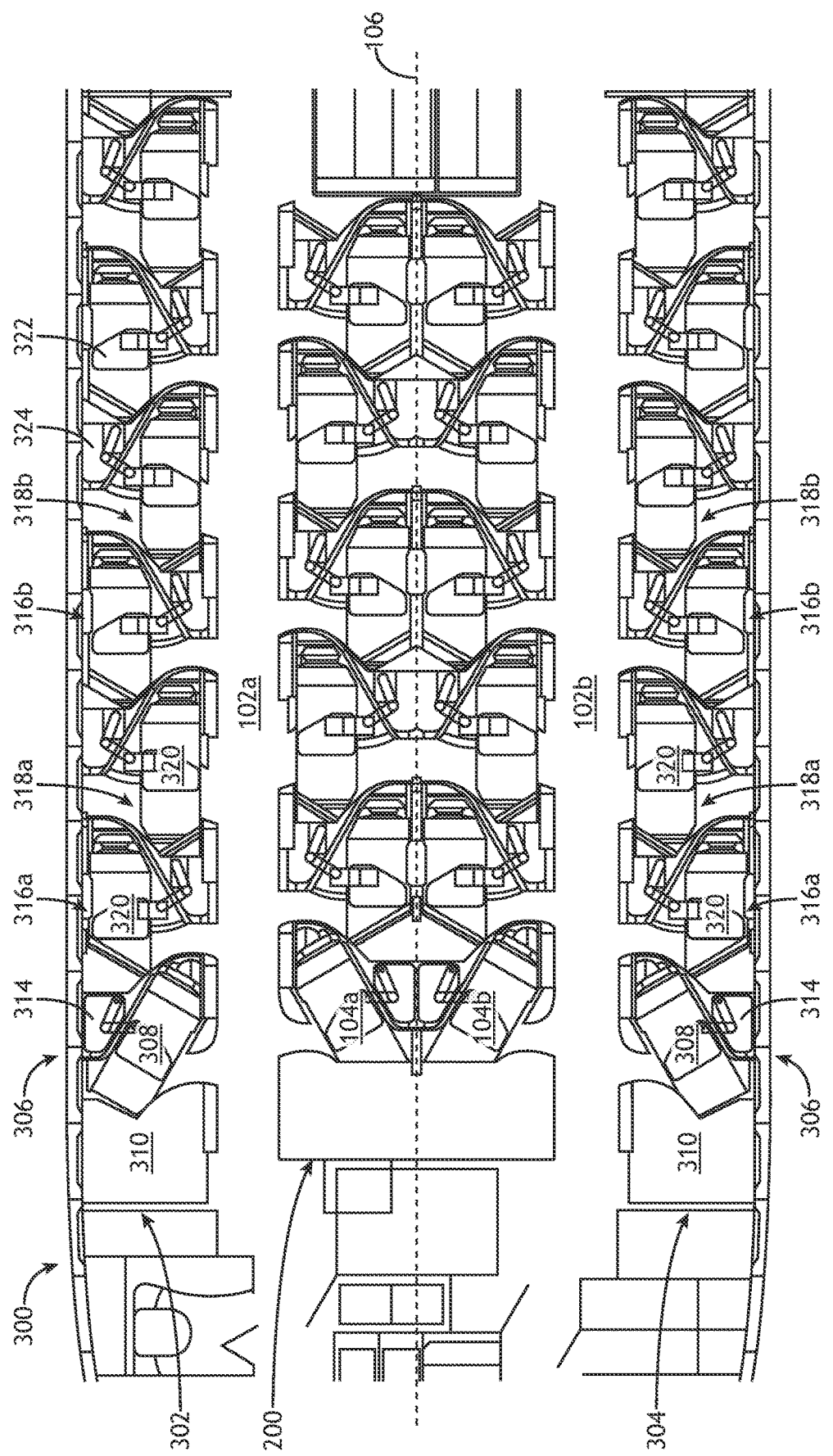
FIG. 3 is a plan view of a layout of lie flats including an oblique first row with a center column toes-in configuration, in accordance with at least one embodiment of the present disclosure.

Referring to FIG. 3, a layout for an aircraft passenger cabin according to an embodiment of the present disclosure is shown generally at 300. The layout includes the center column 200 shown in FIG. 2. The layout 300 further includes the first longitudinal aisle 102a oriented parallel to the aircraft longitudinal axis or aircraft centerline 106, and the second longitudinal aisle 102b oriented parallel to the aircraft longitudinal axis. The layout 300 further includes a starboard column 302 of lie flat seats positioned to one side of the first longitudinal aisle 302, and a port column 304 of lie flat seats positioned to one side of the second longitudinal aisle 102b. In some embodiments, the starboard column 302 and the port column 304 are symmetrical about the aircraft centerline 106.

Each of the starboard column 302 and the port column 304 include a first row 306, such as a front row, including a single oblique seat 308. As shown, the single oblique seats 308 are oriented toes-out to maximize privacy of these seats and with respect to the oblique seats positioned directly across the respective longitudinal aisle 102a, 102b. The first rows of the 306 of the starboard and port columns 302, 304 may longitudinally aligned or staggered with respect to each other and with respect to the front row 100 of the center column 200. Each of the oblique seats 308 is directly accessible from its respective longitudinal aisle.

The oblique seats 308 are shown in the lie flat condition forming a horizontal or substantially horizontal bed. The oblique seats 308 are adjustable between the upright condition for TTOL and the lie flat condition during flight. Intermediate sitting positions may include reclined backrest positions, extended leg rest positions, etc. The oblique seats 308 may or may not include a leg rest. Seats according to the present disclosure may further include head rests, arm rests, climatization systems, massage systems, etc.

The front rows 306 of the starboard and port columns 302, 304 may be positioned directly aft of monuments 310, such as a partition, closet, galley component, lavatory, etc. The monuments 310 may include interior space for storage, appliances, galley carts, passenger quarters, crew quarters, etc. Footwell space may or may not be formed in the monuments to accommodate bed deployment. Each front row 306 further includes a console 314 positioned to one side of its respective oblique seat 308. As shown, the console 314 is positioned to the outboard side considering the two-out seat orientation. Each console 314 may include a horizontal surface that serves as a working surface and mounting location for seat controls, wireless charger, etc. Although not shown, the front rows 306 may further include a deployable meal table, a video monitor, and other amenities commensurate with passenger expectations of a business class seat. Each console 314 may form a footwell for use by a passenger in an aft row. Optional front row 306 features include partition walls, privacy dividers, climatization systems, lighting systems, entry doors, etc.

Each of the starboard and port columns 302, 304 includes a second row 316a, a third row 318a, and a plurality of further rows in alternating fashion of the configuration of the second and third rows 316a, 316b. Thus, the first row 306 is unique as compared to all other rows in the same column, the even number rows 316a, 316b . . . 316n all have the same configuration unique to these rows, and the odd number rows 318a, 318b . . . 318n all have the same configuration unique to these rows (excluding the front row).

From the second row 316a to the end of the starboard and port columns 302, 304, none of these rows include an oblique seat. In other words, only the front row 306 of each column includes oblique seats. As shown, each of the second row 316a through the last row shown include only forward facing seats 320, and more specifically, passenger seats oriented parallel to the aircraft longitudinal axis (i.e., the aircraft centerline 106). Each seat in the second row 316a back includes a console 322 positioned to one side of the seat, which may or may not include a footwell for use by an aft positioned seat. Each seat in the second row 316a back may further include a further console 324 positioned forward of the seat, which may include a footwell for use by the respective seat. Each seat in the second row 316a back is configured to adjust between the upright condition and the lie flat condition. When in the lie flat condition, each seat is configured to nest with at least one other seat.

Figure 4:
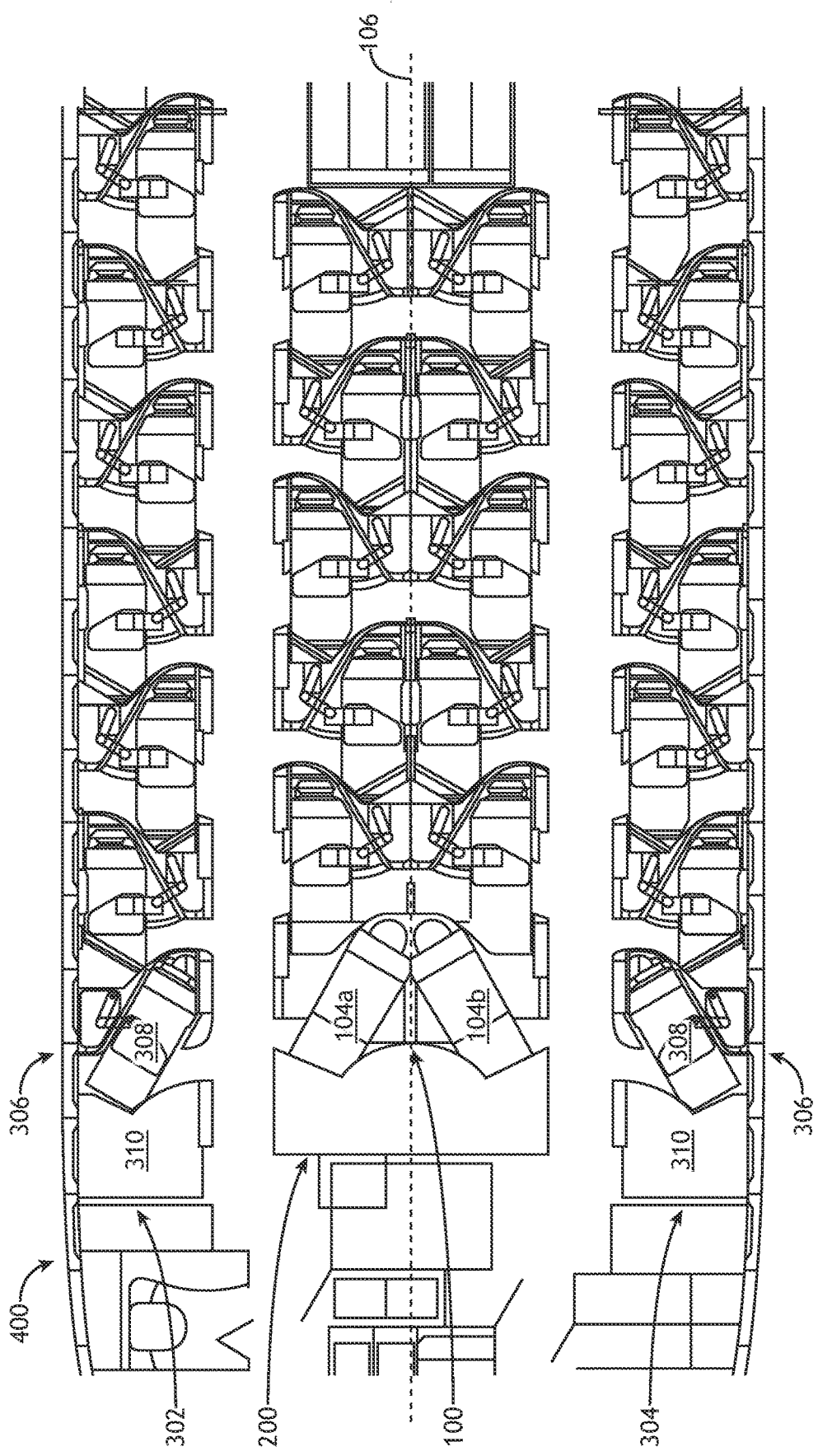
FIG. 4 is a plan view of a layout of lie flats including an oblique first row with a center column toes-out configuration, in accordance with at least one embodiment of the present disclosure.

Referring to FIG. 4, a further layout for an aircraft passenger cabin according to an embodiment of the present disclosure is shown generally at 400. The layout 400 is the same as that shown in FIG. 3 in terms of the configurations of the starboard and port columns 302, 304. The layout 400 differs from that shown in FIG. 3 in terms of the center column 200. Whereas the center column 200 in FIG. 3 includes oblique seats 104a, 104b in the front row 100 that are oriented toe-in, the oblique seats 104a, 104b in the front row 100 in FIG. 3 are oriented toe-out. Considering this change in seat orientation, the seat pairings in the second and subsequent rows include spaced apart followed by side-by-side positioned seats in repeat as the seat rows continue, as compared to the pairings in the second and subsequent rows in the previous embodiments including side-by-side followed by spaced apart seat pairings in repeat.

Figure 5:
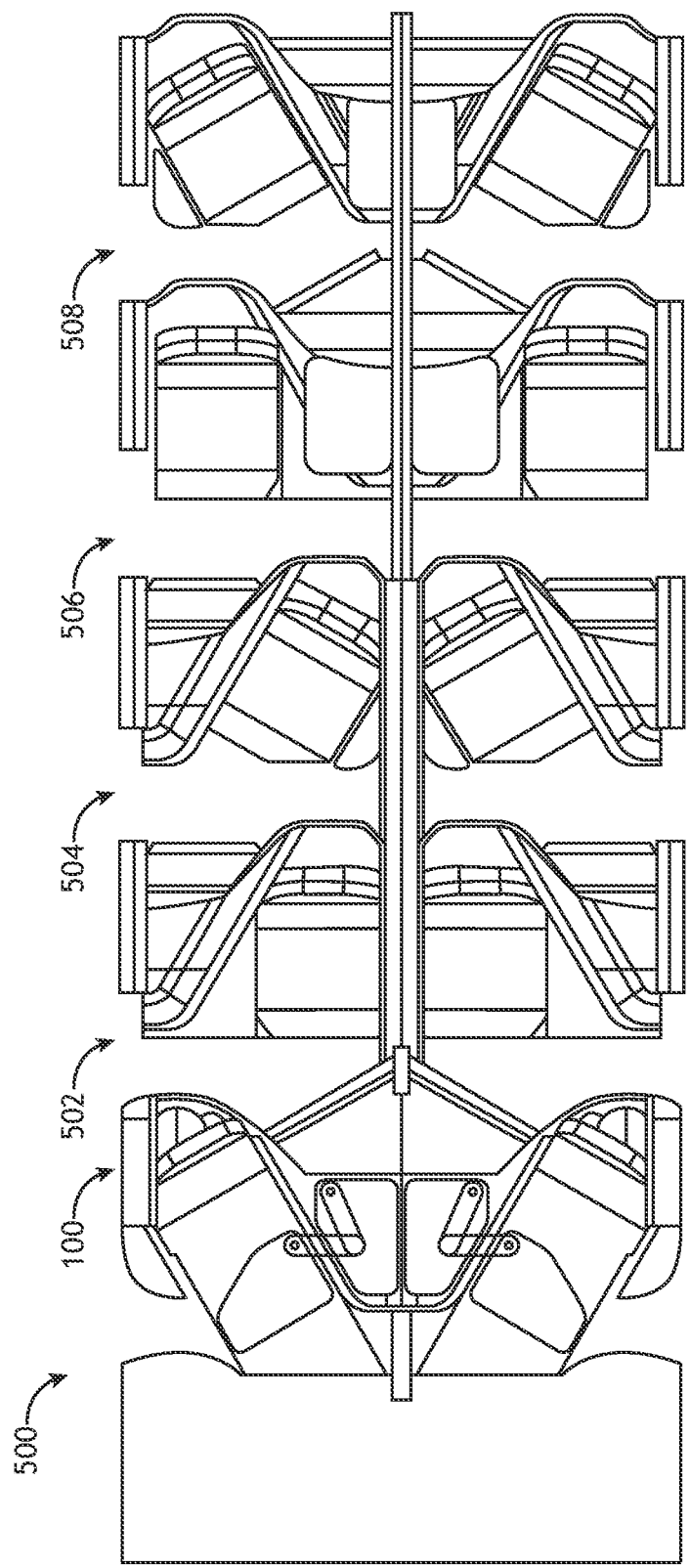
FIG. 5 is a plan view of a further layout for a center column including an oblique first row.

Referring to FIG. 5, a further layout for a center column according to an embodiment of the present disclosure is shown generally at 500. In this center column 500, the front row 100 includes the toe-in oblique seat pairing, the second row 502 includes a forward facing seat paring with a zero degree installation angle, the third row 504 includes a forward facing seat pairing with an installation angle of 18 degrees or less, for instance about 11 degrees, the fourth row 506 includes a forward facing seat paring with a zero degree installation angle, and the fifth row 508 includes a forward facing seat pairing with an installation angle of 18 degrees or less, for instance about 11 degrees. The center column 500 may continue with a repeat of the second through fifth columns until the end of the column.

Considering the center column 500 includes forward facing seats at a shallow angle, various combinations of toes-in versus toes-out configurations are possible. As shown, the seat pairing in the second row 502 is side-by-side therefore the seat pairing in the third row 504 is a toes-out configuration, therefore the seat pairing in the fourth row 506 is spaced apart, therefore the seat pairing in the firth row is a toes-in configuration. Seat angles may vary so long as the second and further rows each include forward facing seats and not any oblique seats. Each forward facing seat in the second and further rows includes at least one console as discussed in the above embodiments as well as the optional seat row features.

Figure 6:
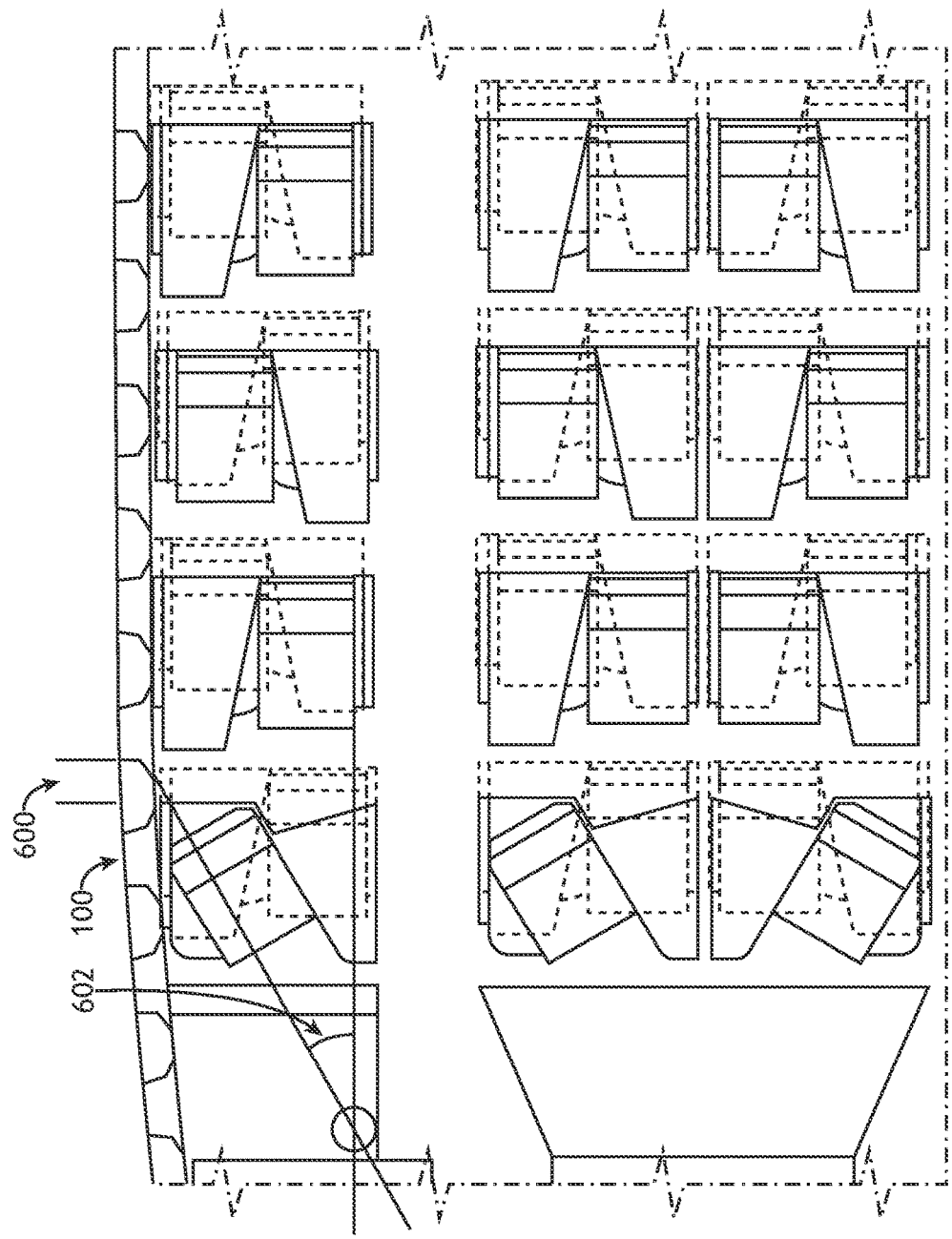
FIG. 6 is an overlay showing space saving provided by an oblique first row according to the present disclosure.

Referring to FIG. 6, this figure shows an oblique front row 100 according to the present disclosure overlaid on a conventional layout include all forward facing lie flat seats. The oblique seat angle in the front row 100 shortens a longitudinal length of the front row 100 thereby allowing each subsequent row to be shifted forward in the cabin. For an oblique seat installation angle of about 30 degrees as indicated at reference numeral 602, the shortened front row 100 provides a space gain of about 7 inches to about 9 inches, indicated at reference numeral 600, which is realized along the length of the cabin, thereby balancing seat density and lie flat all-access configurations.

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed:

1. A layout for a column of lie flat passenger seats for an aircraft passenger cabin, comprising:

a first row including at least one oblique seat;
a second row positioned directly aft of the first row and including at least one forward facing seat;
a third row positioned directly aft of the second row and including at least one forward facing seat positioned laterally offset relative to the at least one forward facing seat of the second row; and
a fourth row positioned directly aft of the third row and including at least one forward facing seat positioned laterally offset relative to the at least one forward facing seat of the third row and laterally aligned relative to the at least one forward facing seat of the second row;
wherein:
the first row is a front row of the column and has a shorter longitudinal length, measured from a forward end to an aft end of the first row, than a longitudinal length of each of the second, third, and fourth rows, measured from a forward end to an aft end of each of the second, third, and fourth rows;
none of the second row, the third row, the fourth row, and any additional row positioned aft of the fourth row includes an oblique seat; and
each of the at least one oblique seat and the at least one forward facing seat of each of the second row, the third row, and the fourth row is configured to adjust between an upright condition and a lie flat condition; and
when in the lie flat condition, each of the at least one oblique seat and the at least one forward facing seat of each of the second row, the third row, and the fourth row is configured to nest with at least one other seat.

2. The layout according to claim 1, wherein:
the column is a center column configured to be positioned between two longitudinal aisles oriented parallel to an aircraft longitudinal axis;
the first row includes two oblique seats; and
the two oblique seats are oriented in a toes-out or a toes-in configuration.

3. The layout according to claim 2, wherein:
the second row includes two forward facing seats positioned side-by-side;
the third row includes two forward facing seats positioned spaced apart; and
the fourth row includes two forward facing seats positioned side-by-side.

4. The layout according to claim 3, further comprising a partition wall positioned aft of each of the first row, the second row, the third row, and the fourth row.

5. The layout according to claim 2, wherein a portion of each of the two oblique seats, when in the lie flat condition, extends into a footwell space formed in a monument positioned forward of the front row.

6. The layout according to claim 2, further comprising a partition positioned between the two oblique seats, the partition configured to adjust between an extended condition and a retracted condition.

7. The layout according to claim 1, further comprising a console positioned to one side of each of the at least one oblique seat of the first row, the at least one forward facing seat of the second row, the at least one forward facing seat of the third row, and the at least one forward facing seat of the fourth row.

8. The layout according to claim 7, further comprising a footwell formed in the console.

9. A layout for a passenger cabin of an aircraft, comprising:
a first longitudinal aisle oriented parallel to an aircraft longitudinal axis;
a second longitudinal aisle oriented parallel to the aircraft longitudinal axis;
a starboard column of lie flat seats positioned to one side of the first longitudinal aisle;
a port column of lie flat seats positioned to one side of the second longitudinal aisle; and
a center column of lie flat seats positioned between the first longitudinal aisle and the second longitudinal aisle;
wherein:
a first row of each of the starboard column and the port column includes a single oblique seat oriented in a toes-out or a toes-in configuration;
a second row, positioned directly aft of the first row, of each of the starboard column and the port column includes a single forward facing seat;
at least two additional consecutive rows, positioned directly aft of the second row, of each of the starboard column and the port column includes a single forward facing seat;
a first row of the center column includes two oblique seats oriented in a toes-out or a toes-in configuration;
a second row of the center column includes two forward facing seats;
at least two additional consecutive rows of the center column, positioned directly aft of the second row, includes at least two forward facing seats; and
none of the second row, the at least two additional consecutive rows, and any additional row positioned aft of the at least two additional consecutive rows of any of the starboard column, the port column, and the center column includes an oblique seat; and
the first row of each of the starboard column, the port column, and the center column is a front row of the respective column and has a shorter longitudinal length, measured from a forward end to an aft end of the first row, than a longitudinal length of each of the second and at least two additional rows, measured from a forward end to an aft end of each of the second and at least two additional rows.

10. The layout according to claim 9, wherein:
the layout further includes a monument positioned forward of the front row of each of the starboard column, the port column, and the center column, each monument including a footwell.

11. The layout according to claim 9, wherein, in the center column, the two forward facing seats of the second row are positioned side-by-side, and the two forward facing seats of each of the at least two additional consecutive rows are positioned side-by-side or spaced apart in alternating rows.

12. The layout according to claim 9, further comprising, in each of the starboard column, the port column, and the center column, a partition wall positioned aft of each of the first row, the second row, and the at least two additional consecutive rows.

13. The layout according to claim 9, further comprising a partition positioned between the two oblique seats in the center column, the partition configured to adjust between an extended condition and a retracted condition.

* * * * *